INVENTOR
WILLIAM R. BELKO JR.
BY Arnold Grant
ATTORNEY

INVENTOR
WILLIAM R. BELKO JR.
BY Arnold Grant
ATTORNEY

United States Patent Office 3,452,257
Patented June 24, 1969

3,452,257
ELECTRICAL CAPACITOR

William R. Belko, Jr., Huntington, Conn., assignor to Vitramon, Incorporated, Monroe, Conn., a corporation of Delaware Continuation-in-part of application Ser. No. 677,309, Oct. 23, 1967. This application Mar. 28, 1968, Ser. No. 716,976
Int. Cl. H01g *1/02*
U.S. Cl. 317—261 8 Claims

ABSTRACT OF THE DISCLOSURE

A capacitor has a plurality of flat electrodes embedded in insulation. Connection between electrodes of the same polarity is made by a terminal with a large head in contact with the ends of the embedded plates. The terminal also provides means to connect to external circuitry.

This application is a continuation-in-part of copending application, Ser. No. 677,309, filed Oct. 23, 1967, now abandoned.

One of the most important criteria in the design and manufacture of ceramic capacitors is volumetric efficiency, which is defined as the capacitance rating per unit volume of the component. The object being to attain the largest capacitance rating possible from the smallest volume possible. Capacitance rating of a component can be found by multiplying the permitivity [i.e., the dielectric constant of the dielectric material times a known constant ($8.85 \times 10^{-12}$)] times the product of the overlapping area of the capacitor plates divided by the distance between the plates. Therefore, for a given dielectric material and a given distance between the capacitor plates, the sole determinant of the capacitance rating of the component is the overlapping area of the plates. The object then becomes one of maximizing the overlapping area of the plates in a given capacitor volume, which thereby correspondingly maximizes capacitance and volumetric efficiency. Heretofore, two major factors have prevented the plate area from being maximized, i.e., from assuming the same length and width as the component. The first is inherent in the component itself, its size and its method of manufacture. Each of the plates must either be substantially surrounded by the dielectric material or the component must be coated with an insulating material to prevent contamination of the plates and to prevent the plates from contacting each other or some other component and shorting the circuit. The most prevalent method of manufacture of ceramic capacitors is a build-up technique involving screen printing of a plurality or composite of ceramic plates onto a sheet of dielectric material, repeating the process until the desired number of plates and dielectric sheets are printed, and then cutting the composite into individual components. Since these components are extremely small it is very difficult to position each successive plate screen print directly above the preceding plate. Therefore, the border area between the plate edges and the component edges, incorporated to insure that the plates will be positioned within the confines of the component, must be slightly enlarged to account for the exigencies of screen registration. Similarly, during the cutting procedure, it is very difficult to cut the composite into the extremely small individual components unless some further allowance is made in the border areas both for the width of the cutting tool and the possibility of misalignment of the cutting tool relative to the component, ie., when cutting between two rows of components it is difficult to align the cutting tool exactly at the midpoint between the components.

The second major detractant was in the method of electrically connecting the terminal portion of the leads used to attach the component to external circuitry. In a capacitor of the type here disclosed, there are two distinct sets of plates, one set of plates for each lead. Each lead must therefore be in electrical association with only one set of plates or the component will short. The prior art approach to this problem was to cover a portion of the plate screen thereby making a cut-out in the plate pattern; and, then to print each plate as a mirror image of the immediately preceding plate. That is, the first set of plates would have the cut-out portion in one corner of the component and the second set would have the cut-out portion in another corner. A shaft would then be drilled into each of the aforementioned corners having a cut-out portion and the shafts filled with conductive material. The result being that each shaft electrically connects only the plates of one of the plate sets; the plates of the other set have their cut-out portion in the path of the shaft, thereby avoiding contact with the shaft. A lead terminal hole is then drilled perpendicular to the shaft to intercept the shaft. The hole is metalized and a lead terminal inserted and soldered into position, to the metal and against the shaft, to complete the operation.

This terminal configuration is particularly advantageous in that the relatively deep intrusion of the lead terminal into the component maximizes the terminal-component interface which means that the lead has a large shear area and thus substantial shear strength. Shear strength, in turn, is determinative of the reliability of the lead-component connection; the usual test of quality being a five pound pull for a period of five seconds. However, it is considered standard procedure in components of this type, to insure reliability by designing in a safety factor of at least two to four, so that the leads must actually be capable of withstanding a pull of from ten to twenty pounds for at least ten to twenty seconds.

While the increased shear strength available with this lead terminal configuration satisfies one design criteria, it has an equally significant disadvantage in that this strength must be obtained at the sacrifice of overlapping plate area and thus capacitance and volumetric efficiency. The importance of this area reduction becomes apparent when it is realized that if a portion is cut-out from each plate set the reduction in overlapping plate area is not one, but two times the area of the cut-out portion. Thus, if 20 percent of the plate area is cut out, the plate overlap area is reduced by 40 percent; and, correspondingly, all other factors remaining constant, the capacitance and volumetric efficiency are reduced by 40 percent. The problem therefore becomes one of increasing volumetric efficiency without sacrificing terminal strength.

It is an object of the present invention to overcome the above mentioned problems by providing a capacitor having maximum volumetric efficiency and maximum terminal strength. This objective is attained by confining the major portion of the lead terminal to the border area of the component and by increasing the dimensions of the terminal. That is, instead of having the terminal portion of the lead extend deep into the component to acquire the requisite shear area, the present invention obtains the same result by substantially increasing the dimensions of the terminal portion of the lead and the opening in the component which receives the terminal. The shear area vis-a-vis the prior art lead configuration, remains constant because the increased surface area corresponding to the increased dimensions compensates for the loss in depth. Similarly, the cut-out portions of the capacitor plates can be reduced to a minimum since the terminal portion of the lead extends only a very short distance beyond the border area of the component, thereby maximizing capacitance rating and volumetric efficiency.

It is therefore another object of the present invention to provide a novel terminal for the connection of electronic components to external circuitry.

It is still another object of the present invention to confine the major portion of the enlarged lead terminal within the area between the edge of the capacitor plate and the surface of the component.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings, in which:

Figure 1:
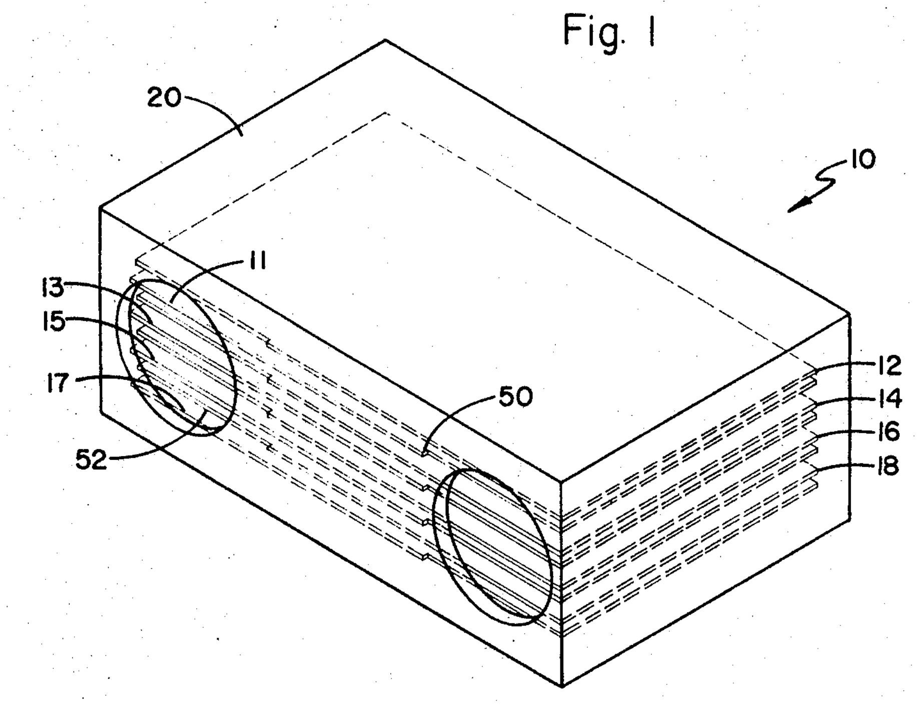
FIGURE 1 is a perspective diagrammatic representation of an electronic component suitable for the lead connection of the first embodiment of the present invention.
Figure 2:
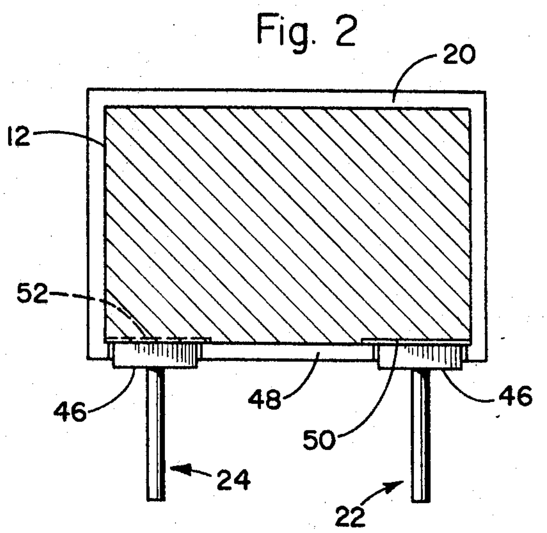
FIGURE 2 is a plan view of a capacitor plate of a component utilizing the lead connection of the first embodiment of the present invention.
Figure 4:
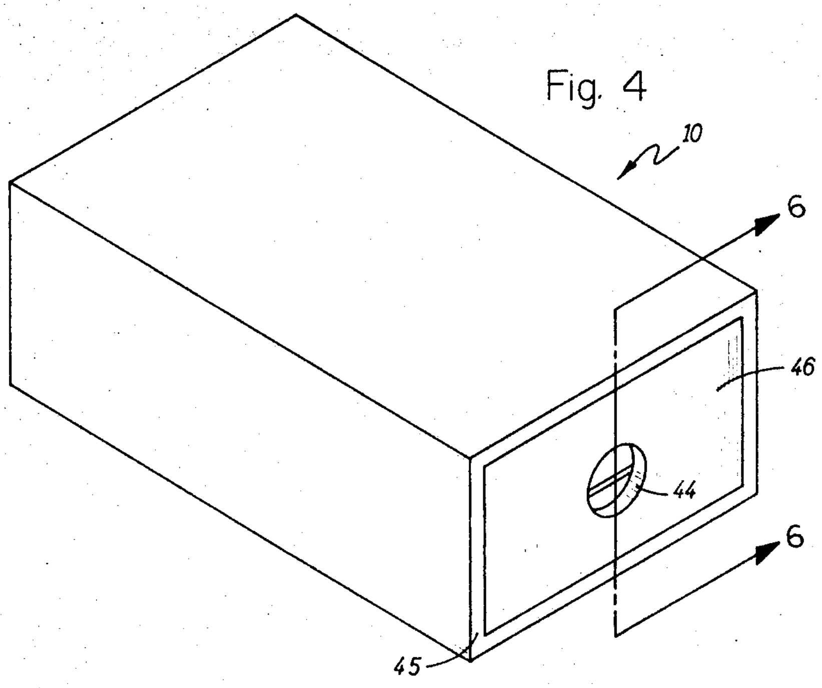
FIGURE 4 is a perspective view of an electronic component suitable for the lead connection of the second embodiment of the present invention.
Figure 6:
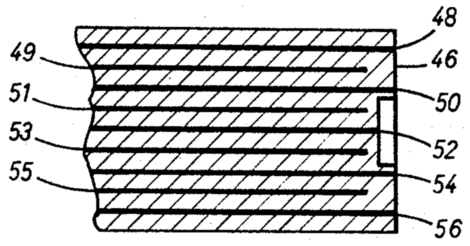

Referring now to the drawings the present invention's approach to the problem of balancing volumetric efficiency and shear strength will be described in detail. As depicted in FIGURES 1 and 2, an electronic component, shown generally at 10, comprises a monolithic body having two series of spaced capacitor plates 11–18 alternating with and wholly embedded within layers of dielectric material 20. The odd number conductive plates, i.e., 11, 13, 15 and 17, comprise plate group A and the even number conductive plates, i.e., 12 14, 16 and 18, comprise plate group B, to form a multiplate capacitor, in a manner well known in the art. It should be understood at this point that the component parts of the capacitor diagrammatically shown in FIGURE 1, as well as the capacitor of the embodiments shown in FIGURES 4 and 6 are intentionally drawn out of their true proportions, relative to each other and the component, as a whole. Capacitors of this type have dimensions generally on the order of .1 to .5 inches thick with the conductive plates 11–18 normally being in the range of from .00001 to .001 inch thick and the dielectric layers normally being in the range of from .001 to .1 inch thick. It will, thus, be appreciated that if the conductive layers were shown in their true proportion relative to the dielectric layers they would be too thin to appear in the drawings. The concept of a monolithic body is equally as critical to a full comprehension of the present invention; the term being herein used to define a unitary fused or sintered body which is incapable of separation by ordinary mechanical means.

Figure 3:
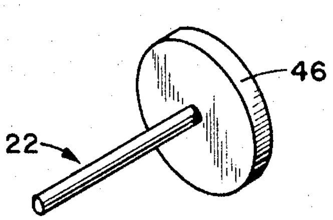
FIGURE 3 is a perspective view of the lead used in the first embodiment of the present invention.

A border area of dielectric material circumnavigates each of the conductive plates 11–18 to prevent the plates from being exposed and shorting the component; either by a member of one conductive plate group contacting a member of another conductive plate group, or one of the conductive plates contacting another component. Applicant realized that since the essential factor in determining shear strength is the surface area of the interconnection between the lead and the component, maximum surface area and minimum penetration of the conductive plates could be achieved by increasing the dimensions of the terminal portion of the leads keeping the dimensions of the connecting portion i.e., that portion of the lead used to connect the component to external circuitry, constant, and utilizing the essential but, heretofore, wasted border area. That is, instead of maximizing penetration of the lead into the component to obtain the requisite shear area, the same result can be obtained when, as shown in FIGURES 1–3, the diameter of the terminal, portion 46 of the leads 22, 24 is increased within the width of the border area. In this manner, penetration of the lead into the plate area is kept to an absolute minimum; the conductive plates being cut back only to prevent the members of each plate group from contacting more than one lead. The most direct method of cutting back the conductive plates is to blank off a portion of the plate printing screen used during the build-up step of the manufacturing process. During the process, the conductive plates are deposited on the dielectric preceding material layers with every other layer of conductive material being a mirror or reverse image of the preceding conductive material layer. The result being two distinct sets of plates, A and B, each having a minimal stepped portion adjacent an edge of the conductive layer. As shown in FIGURE 2 stepped portion 50 on conductive plate 12 is in solid line while the stepped portion on proceeding conductive plate 13 is shown by the dotted line 52.

In the particular embodiment of FIGURES 1–3, the diameter of the terminal portion 46 of the leads 22, 24 is determined by the distance between the first and last conductive plates of each plate group. Preferably, the terminal portion 46 is of conductive metal and thus serves the double function of electrically connecting each of the conductive plates of the plate group as well as electrically connecting the plate group to external circuitry. Alternatively, the terminal may be formed of a material similar to the dielectric, the lead extending completely through and corresponding to the conductive plate engaging surface of the terminal portion 46, with a conductive material being applied to the conductive plate engaging surface of the terminal portion. In either case, the terminal portion seals the drilled openings in the component, which expose the conductive plates of each plate group, and provides the sole electrical communication between the individual conductive plates of each plate group.

Figure 5:
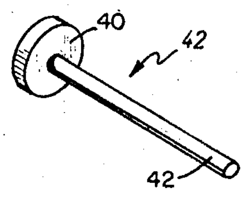
FIGURE 5 is a perspective view of the lead used in the second embodiment of the present invention; and, FIGURE 6 is a view in section taken along the line 6—6 of FIGURE 5.

Turning now to FIGURES 4–6 a second embodiment of the present invention will be described in detail. In this embodiment as in the first embodiment, the terminal portion 40 of the lead 42 is substantially larger than the diameter of the lead. However, the drilled opening 44, shown axially only by way of example, is somewhat smaller than the openings of the component of FIGURES 1–3. Electrical communication is obtained by having the conductive plates of plate group A extend to, and correspond with, the flanking surface 45 of the component. A conductive metal coating 46 is then applied over the surface and into drilled opening 44 coating each of the exposed conductive plates and thereby providing electrical communication between each of the members of plate group A, i.e., 48, 50, 52, 54 and 56, and between plate group A and the terminal portion 40 of the lead 42. One particular advantage of this configuration is that additional area can be assigned to each conductive plate thereby further increasing volumetric efficiency. It will be noted that in the area of drilled opening 44, the members of plate group B, i.e., 49, 51, 53, 55 and 57, are embedded further into the component than on either side of the drilled opening 44. However, the distance between the component edge and the edge of the conductive plates of this group corresponds to a little more than the normal border area on components of this type. So that, while this embodiment may present some difficulty during the screen printing process wherein the conductive plates are deposited on the layers of dielectric material, applicant has found that the increase in efficiency far outweighs the technical problems.

As this invention may be embodied in several forms without departing from the spirit or essential character thereof, the present embodiments are illustrative and not restrictive. The scope of the invention is defined by the appended claims rather than by the description preceding them, and all embodiments which fall within the meaning and equivalency of the claims are, therefore intended to be embraced by those claims.

I claim:

1. An electronic component comprising a monolithic body having a plurality of generally planar layers of a dielectric material alternating with a plurality of layers of a conductive material, each layer of conductive material having at least a major portion thereof confined within the boundaries of the dielectric material layers; at least one opening in the body entering the body along a surface perpendicular to the layers of conductive material, the opening being intermediate the surfaces of the body parallel to the layers of conductive material, the major dimension of the exterior portion of the opening extending over at least a major portion of the linear distance between the surfaces of the body, parallel to the layers of conductive material, the opening extending into the body at least to the leading edge of a pre-selected number of conductive layers; and, at least one lead of conductive material to connect the component to external circuitry, the lead having a connecting portion and a terminal end, the terminal end substantially conforming to the dimensions of the opening in the body and having substantially larger dimensions than the connecting portion of the lead in a plane generally perpendicular to the layers of conductive material, the terminal end being fixedly attached in the opening in the body thereby sealing the opening in the body and in electrical communication with each of the pre-selected conductive layers with the connecting portion extending outwardly from the component in a direction generally parallel to the layers of conductive material.

2. An electronic component as defined in claim 1 wherein the terminal end of the lead provides the sole electrical communication between at least two of the pre-selected conductive layers.

3. An electronic component as defined in claim 1 wherein each conductive layer has at least one minor portion adjacent at least one corner thereof removed and every conductive layer is a mirror-image of the immediately preceding conductive layer such that there are at least two sets of conductive layers, the first set having the removed portion adjacent one corner and the other sets having their removed portion adjacent the remaining corners.

4. An electronic component as defined in claim 3 wherein the openings in the body intermediate the uppermost and lowermost surfaces threof enter the body adjacent the removed portion of the conductive layers.

5. An electronic component as defined in claim 1 wherein the pre-selected conductive layers have at least a portion thereof coated with a conductive material to electrically interconnect the pre-selected conductive layers, the terminal end of the lead abutting against the conductive coating to electrically connect the pre-selected conductive coating to electrically connect the pre-selected conductive layers to external circuitry.

6. An electronic component as defined in claim 1 wherein a first set of selected conductive layers extends to and corresponds with a flanking surface of the body at least one of the openings into the body entering the body through that flanking surface; a conductive coating covering at least a major portion of the conductive layers corresponding with the flanking surface, the coating extending into the opening and covering a second set of selected conductive layers extending to the surface of the opening to electrically connect the first and second sets of selected conductive layers; and, a conductive lead having a terminal end fixedly attached in said opening to electrically connect each of the coated conductive layers with external circuitry.

7. An electronic component as defined in claim 1 wherein a first selected group of conductive layers extends to and corresponds with a flanking surface of the body, at least one of the openings into the body entering the body through that flanking surface; a conductive coating covering at least a major portion of the conductive layers corresponding with the flanking surface; and, a conductive lead having a terminal end fixedly attached in said opening, the terminal end providing electrical communication between the members of a second selected group of conductive layers and between the first selected group of conductive layers and the second selected group of conductive layers.

8. An electronic component as defined in claim 1 wherein the terminal end of the conductive lead provides the sole electrical communication between the preselected conductive layers.

References Cited

UNITED STATES PATENTS

| | | | |
|---|---|---|---|
| 2,413,539 | 12/1946 | Ballard | 317—261 X |
| 2,919,483 | 1/1960 | Gravley | 317—261 X |
| 3,195,027 | 7/1965 | Vandermark | 317—261 X |
| 3,235,939 | 2/1966 | Rodriguez. | |

E. A. GOLDBERG, *Primary Examiner.*

U.S. Cl. X.R.

317—242